United States Patent [19]

Newman et al.

[11] Patent Number: 5,175,701
[45] Date of Patent: Dec. 29, 1992

[54] SYSTEM FOR PERFORMING LINEAR INTERPOLATION

[75] Inventors: Gary H. Newman, Concord, Mass.; Steven S. McLafferty, Nashua, N.H.

[73] Assignee: Eastman Kodak Company, Rochester, N.Y.

[21] Appl. No.: 773,973

[22] Filed: Oct. 8, 1991

Related U.S. Application Data

[63] Continuation of Ser. No. 696,299, Apr. 29, 1991, abandoned, which is a continuation of Ser. No. 385,242, Jul. 25, 1989, abandoned.

[51] Int. Cl.$^5$ .......................................... G06F 15/353
[52] U.S. Cl. .................................................. 364/723
[58] Field of Search ........................................ 364/723

[56] References Cited

U.S. PATENT DOCUMENTS

| | | | |
|---|---|---|---|
| 3,247,365 | 4/1966 | Dell et al. | 364/723 |
| 3,412,240 | 11/1968 | Hunt et al. | 364/723 |
| 3,678,258 | 7/1972 | Patmore et al. | 364/723 |
| 3,748,447 | 7/1973 | Hajicek et al. | 364/723 |
| 4,031,369 | 6/1977 | Heaman et al. | 364/723 |
| 4,213,186 | 7/1980 | Murata | 364/723 |
| 4,334,240 | 6/1982 | Franklin | 358/78 |
| 4,402,012 | 8/1983 | Knight | 358/160 |
| 4,468,747 | 8/1984 | Leavitt et al. | 364/577 |
| 4,477,833 | 10/1984 | Clark et al. | 358/80 |
| 4,511,989 | 4/1985 | Sakamoto | 364/723 |
| 4,639,920 | 1/1987 | Kaneko | 364/723 |
| 4,672,433 | 6/1987 | Yamamoto et al. | 358/80 |
| 4,837,722 | 6/1989 | Sara | 364/723 |
| 4,841,462 | 6/1989 | Vigarié et al. | 364/723 |

Primary Examiner—David H. Malzahn
Attorney, Agent, or Firm—Mark Z. Dudley

[57] ABSTRACT

An interpolation system generates an interpolated value in response to an input value. The interpolation system includes a function value store comprising a plurality of function value storage tables for storing function values for alternating domain coordinate values in a domain. An address generator, in response to an input value, generates address signals identifying locations in the function value storage tables to enable the function value storage tables to transmit function values in parallel. An interpolator receives function values transmitted in parallel by the function value storage tables and the input value and generating in response thereto the interpolated value.

18 Claims, 4 Drawing Sheets

SYSTEM FOR PERFORMING LINEAR INTERPOLATION

This is a continuation of co-pending application Ser. No. 696,299 filed on Apr. 29, 1991, now abandoned, which in turn is a continuation of co-pending application Ser. No. 385,242 filed on Jul. 25, 1989 now abandoned.

FIELD OF THE INVENTION

The invention relates generally to the field of computer systems, and more particularly to computation systems for interpolating between known data points.

BACKGROUND OF THE INVENTION

In many applications in the fields of computation and numerical analysis, the value of a function at a desired domain coordinate must be approximated from known values of the function at other points in the domain. As an example, air pressure (the function) may be known at a set of locations on the earth ("location" comprising the domain), and from these known pressures, one may wish to determine a value for pressure at other locations. This can be accomplished by the method of linear interpolation.

In linear interpolation, the function is assumed to be piecewise linear between adjacent points in the domain, each identified by a domain coordinate value at which the function values are known. Thus, the relation of the interpolated value at a target point in the domain, that is, the domain coordinate value of the point in the domain at which the function value is to be interpolated, to the function values at the known points at adjacent domain coordinate value is linearly proportional to (1) the desired domain coordinate's relative distance from the known points, and (2) the difference between the values of the function at the two adjacent known points. Stated mathematically, in a one dimensional domain, this is $$f(x_d) = f(x_1) + \frac{(x_d - x_1)}{(x_2 - x_1)} (f(x_2) - f(x_1)) \quad \text{(Equation 1)}$$

where f is the interpolated function, $x_1$ and $x_2$ are the domain coordinate values of the points at which the function values are known, and $x_d$ is the domain coordinate value at which the function value is being interpolated.

In the prior art, interpolation calculations have been performed by electronic computing systems. In these systems, the function values for the known points are stored in a single electronic memory. For each interpolation, this memory must be accessed twice, once to obtain a function value for each of the two known points with domain coordinates adjacent to the domain coordinate at which interpolation is to take place.

SUMMARY OF THE INVENTION

The invention provides a new and improved system for generating an interpolated value.

In brief summary, the invention provides, in one aspect, an interpolation system that generates an interpolated value in response to an input value. The interpolation system includes a function value store comprising a plurality of function value storage tables for storing function values for alternating domain coordinate values in a domain. An address generator, in response to an input value, generates address signals identifying locations in the function value storage tables to enable the function value storage tables to transmit function values in parallel. An interpolator receives function values transmitted in parallel by the function value storage tables and the input value and generating in response thereto the interpolated value. In another aspect, the invention provides a method of generating an interpolated value in response to an input value comprising the steps of providing a plurality of function value storage tables for storing function values for alternating domain coordinate values in a domain; generating address signals identifying locations in the function value storage tables to enable the function value storage tables to transmit function values in parallel; and receiving function values transmitted by the function value storage tables in parallel and the input value and generating in response thereto the interpolated value.

BRIEF DESCRIPTION OF THE DRAWINGS

The invention is pointed out with particularity in the appended claims, and may be better understood by referring to the following description taken in conjunction with the accompanying drawings, in which:

DETAILED DESCRIPTION OF ILLUSTRATIVE EMBODIMENTS

Figure 1:
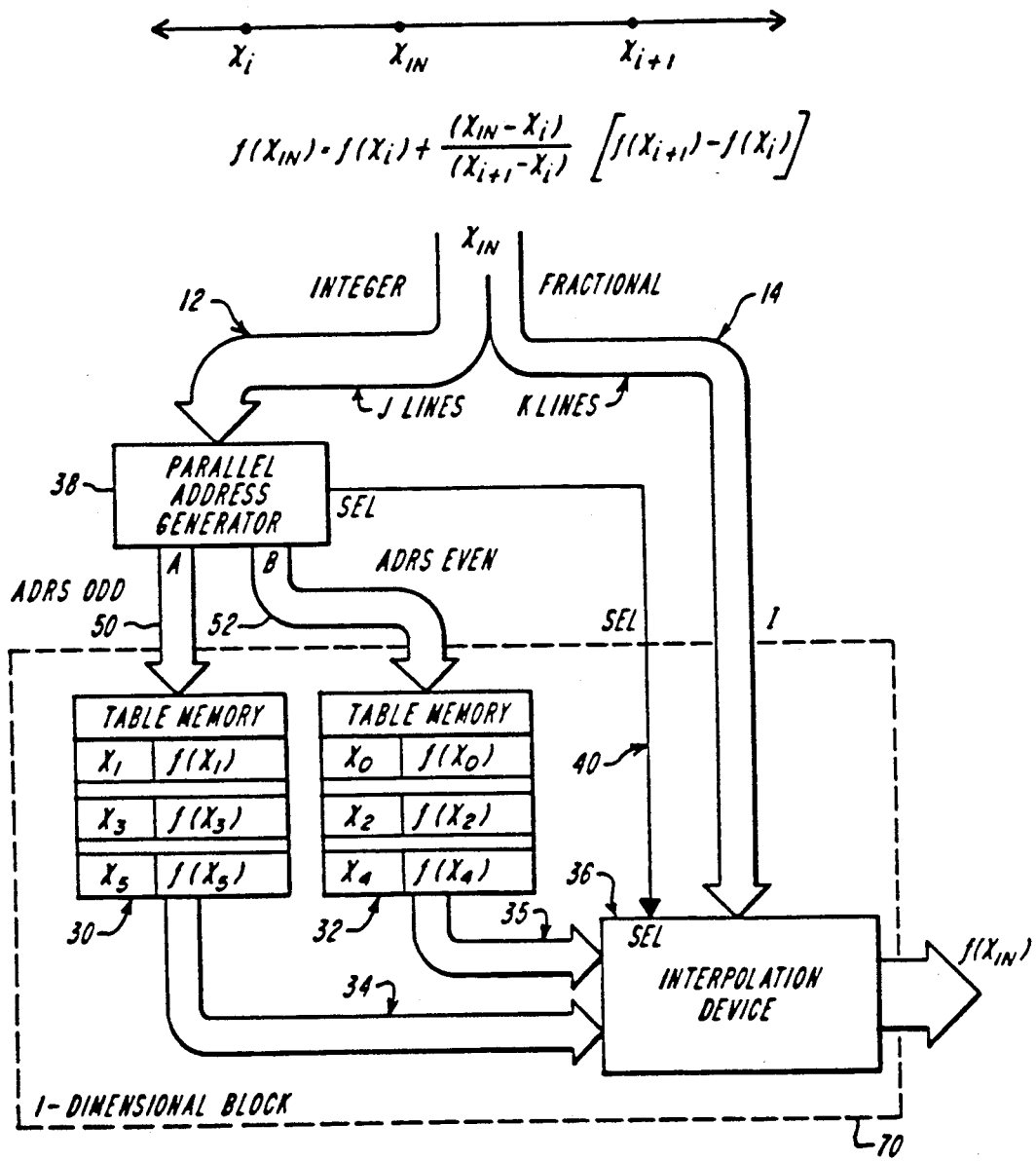
FIG. 1 depicts a functional block diagram of a linear interpolation system according to the invention.

FIG. 1 shows an illustrative embodiment of a linear interpolation system in accordance with the invention. As can be seen in FIG. 1, an interpolation block 70 includes two table memories 30 and 32 that store the function values for the known points. These table memories provide known function values along lines 34 and 35 to an interpolation device 36 in parallel in response to ADRS ODD odd address signals and ADRS EVEN even address signal, respectively, from an address generator 38. The address generator 38 receives a high-order portion of $x_{IN}$ signals along lines 12, defining the high order portion of the domain coordinate value of the target point, that is, the point in the domain at which interpolation is to occur, and generates the ADRS ODD odd address signals and ADRS EVEN even address signals which identify storage locations for function values of known points in the table memories 30 and 32, respectively. In addition, address generator 38 generates an SEL select signal which is coupled to interpolation device 36 on a line 40, and is used thereby as described below.

Interpolation device 36 receives low order $x_{IN}$ signals on lines 14, which define the low-order portion of the domain coordinate value of the target point, as well as the function values at known points from table memories 30 and 32 on lines 34 and 35, respectively, and the SEL select signal. Interpolation device 36 uses these signals as inputs to compute an interpolated function value $f(x_{IN})$ for the domain coordinate value identified by the $x_{IN}$ signals.

In one embodiment, as shown in FIG. 1, function values of the known points, stored in table memories 30 and 32, are provided for each integer domain coordinate value. The function values stored in table 30 are those associated with odd integer domain coordinate values, and the function values stored in table 32 are those associated with even integer domain coordinate values. The function values in successive storage locations in each table memory 30 and 32 are stored in ascending order of their respective associated domain coordinate values, and so the address of each function value in the table memories is in direct correspondence to the integer part of the domain coordinate of the function value's respective known point.

As noted above, the function values for the known points are distributed between the two table memories 30 and 32. It will be appreciated that, since function values for odd coordinate values are stored in table memory 30 and function values for even coordinate values are stored in table memory 32 when, during an interpolation operation, the function values for two adjacent domain coordinate values are obtained, one from each of the table memories 30 and 32. Since two table memories 30 and 32 are provided, function values can be obtained from the two table memories simultaneously. As a result, the arrangement depicted in FIG. 1 requires less time to obtain the function values for known points than prior systems using a single table memory.

That is, table memory 30 provides on line 34 the function value for the odd domain coordinate value proximate the target point, as identified by the $x_{IN}$ signals on line 12, at which interpolation is to occur and table memory 32 provides, on line 35, the function value for the even domain coordinate value proximate the domain coordinate value identified by the $x_{IN}$ signals. As described below, the SEL select signal indicates whether the domain coordinate value for the function values provided by the table memories 30 and 32 are, respectively, above or below the domain coordinate value defined by the $x_{IN}$ signals, to control use by the interpolation device 36 of the signals on lines 34 and 35, as described below. More specifically, with reference to Equation 1, the SEL select signal indicates which of the ADRS ODD odd address signals or ADRS EVEN even address signals correspond to domain coordinate values $x_1$ and $x_2$, and which of the values represented by signals transmitted by the table memories 30 and 32 correspond to function values $f(x_1)$ and $f(x_2)$.

Figure 2:
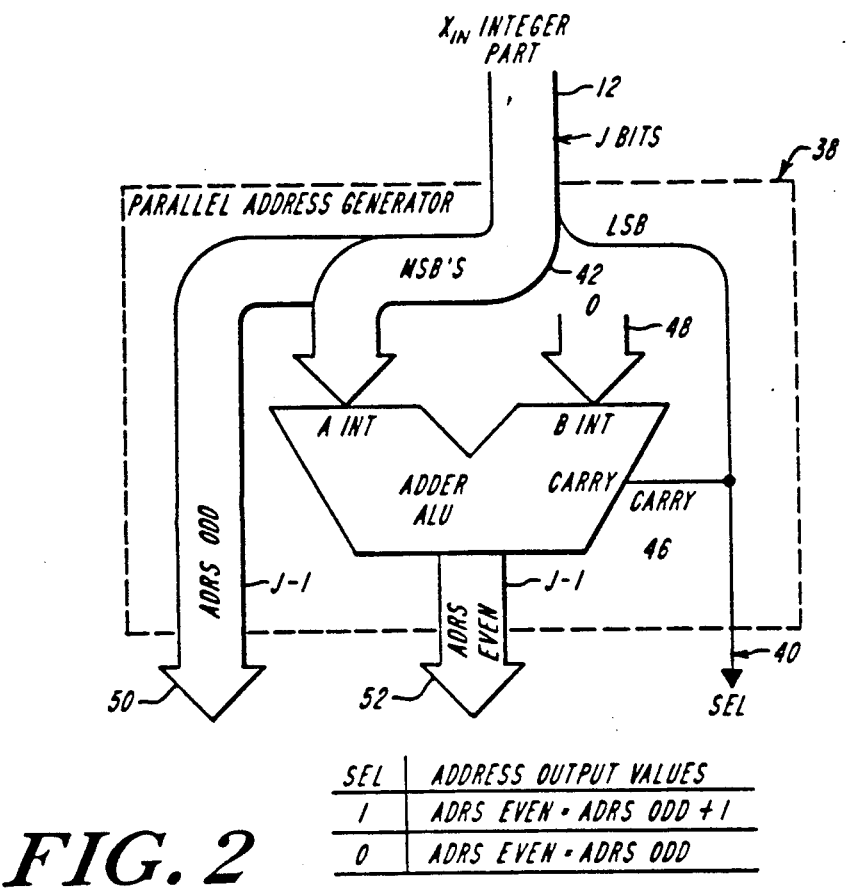
FIG. 2 depicts a block diagram of an address generator useful in the system depicted in FIG. 1.

An illustrative embodiment of an address generator 38 is shown in FIG. 2. The address generator 38 generates the ADRS ODD odd address signals and ADRS EVEN even address signals to identify storage locations in the two table memories 30 and 32, respectively. In addition, the address generator 38 produces the SEL select signal used by the interpolation device 36. In the address generator 38 depicted in FIG. 2, the high-order portion of the $x_{IN}$ signal, which identifies the integer part of the domain coordinate value of the point in the domain at which the function value is to be interpolated, is coupled to address generator 38 along lines 12. The least significant bit of the binary representation of the integer part of the $x_{IN}$ signal determines whether the high order portion of the $x_{IN}$ signal has an even or odd value. Therefore, the least significant bit of the high order portion of the $x_{IN}$ signal indicates whether the domain coordinate value of the target point in the domain, at which the function value is to be interpolated, is just above an even or odd integer domain coordinate value, and so it is coupled onto line 40 as the SEL select signal.

The ADRS ODD odd address signals and ADRS EVEN even address signals are functions of the integer portion of the $x_{IN}$ signals on line 12. More specifically, the address signals are both functions of the integer portion of the $x_{IN}$ signals, except for the low-order signal which provides the SEL select signal. Since each table memory 30 and 32 stores function values for one-half of the integer domain coordinate values, that is, those domain coordinate values at which function values are known, the values of the ADRS ODD odd address signals and ADRS EVEN even address signals are functions of the greatest integer of one-half of the integer portion of the domain coordinate represented by the $x_{IN}$ signals.

More specifically, with reference to FIG. 1, in storage location in the table memories 30 and 32 with the same addresses, the resulting outputs are such that the known point in the domain with the odd integer domain coordinate value has a higher domain coordinate value than the point in the domain having the even integer domain value. Therefore, the address signals generated by the address generator on lines 50 and 52 should represent the same value when the domain coordinate value of the point in the domain at which the function value is to be interpolated lies just above an even integer domain coordinate value. However, when the domain coordinate of the point in the domain at which the function value is to be interpolated lies just above an odd integer domain coordinate value, table memory 32 should be addressed with ADRS EVEN even address signals identifying a location whose address is one greater than the address of the location identified in table memory 30 by the ADRS ODD odd address signals. Address generator 38 generates ADRS ODD odd address signals and ADRS EVEN even address signals that satisfy these criteria.

As discussed above, the least significant bit of the integer part of the domain coordinate of the desired point indicates whether the known point in the domain with the lower domain coordinate value has an even or odd domain coordinate value. Therefore, this bit also indicates whether the ADRS ODD odd address signals and ADRS EVEN even address signals identify the same storage locations in table memories 30 and 32. As shown in FIG. 2, address generator 38, the least significant bit of the integer part of the $x_{IN}$ signals, defining the domain coordinate value of the target point, provides a carry input to a binary adder 46, where the B INP summing input terminal to the adder 46 receives binary zero on lines 48, and the A INP summing input terminal receives the more significant bits of the integer part of the $x_{IN}$ signals. Alternatively, the least significant bit of the integer part of the desired point can simply control the least significant bit carried on lines 48 at the B INP summing input terminal.

The output of the adder 46 provides the ADRS EVEN even address signals generated by the address generator 38, which are used as the address for table memory 32. The more significant bits of the domain coordinate of the desired point, carried on lines 42, are also used as the ADRS ODD odd address signals of the address generator, which is the address for table memory 30. As will be appreciated by those skilled in the art, in this configuration, the value of the ADRS ODD odd address signals equals the value of the ADRS EVEN even address signals when the SEL signal is negated. If the SEL select signal is asserted, the value of the ADRS EVEN even address signals is one greater than the value of the ADRS ODD odd address signal. These results are tabulated in the table at the bottom of FIG. 2. As can be seen from the above, these provide the necessary addresses for the table memories 30 and 32.

Figure 3:
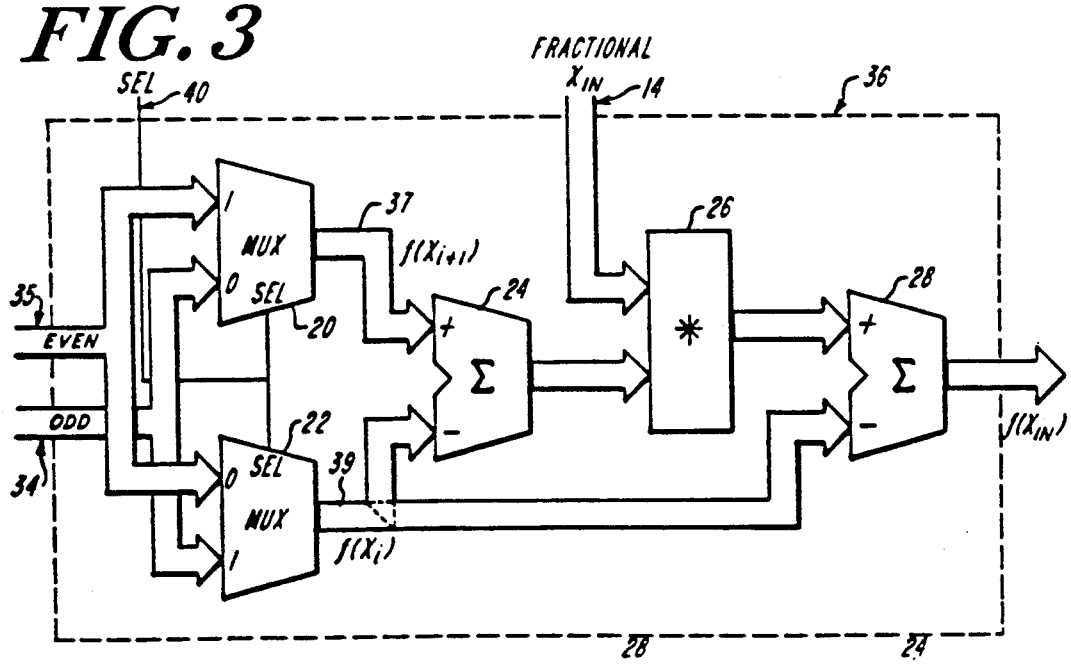
FIG. 3 depicts a block diagram of an interpolation device useful in the system depicted in FIG. 1.

A functional block diagram of interpolation device 36 is illustrated in FIG. 3. As shown in FIG. 3, the interpolation device 36 receives the function values from the table memories 30 and 32 along lines 34 and 35. Lines 34 have been labeled "odd" to indicate that they carry function values from table memory 30, which contains the function values for the odd domain coordinate values. Similarly, lines 35 have been labeled "even" to indicate that they carry the function values for the even domain coordinate values from table memory 32. Lines 34 and 35 connect to two multiplexers 20 and 22, both of which are controlled in unison by the SEL select signal so that multiplexer 20 couples the function value of the known point whose domain coordinate value is immediately above that of the target point, as identified by the $x_{IN}$ domain coordinate value, onto lines 37 and multiplexer 22 couples the function value of the known point whose domain coordinate value is immediately below the targeted point onto lines 39.

Further circuitry, comprising a subtractor 24, a multiplier 26 and a second adder 28, generates the function value at the target point, using the function values represented by the signals on lines 37 and 39 and the low order portion of the $x_{IN}$ signals, denoting the fractional portion of the $x_{IN}$ signals, on lines 14. As noted above, the known points are at integer domain coordinate values, which simplifies the interpolation computation. Specifically, referring to the equation at the bottom of FIG. 3, the difference between the domain coordinates of the known points, that is, the value "$(x_{i+1} - x_i)$," is always equal to "one," because the domain coordinate values of the known points always lie at sequential integer domain coordinates. Additionally, for similar reasons, the difference between the domain coordinate of the desired point and the domain coordinate of the lower known point, indicated by the expression "$(x_{IN} - x_i)$" in the equation is simply equal to the fractional part of the domain coordinate value of the target point, which, in turn, corresponds to the low order portion of the $x_{IN}$ signals on lines 14.

Thus, the calculation circuitry comprising subtractor 24, multiplier 26, and adder 28, in the interpolation device 36 evaluates the expressions in the portion of the interpolation equation illustrated at the lower right of FIG. 3. Specifically, subtractor 24 provides the difference of the function values at the known points, as indicated by the expression labelled 24 in the equation. Multiplier 26 multiplies this difference by the fractional component of the domain coordinate value of the target point (represented by the signals carried on lines 14), as indicated by expression labelled 26 in the equation. Finally, adder 28 provides the sum of the product generated by multiplier 26 and to the function value at the known point having the lower domain coordinate value in the domain, as indicated by expression labelled 28 in the equation, thereby providing the interpolated value for the target point represented by the $x_{IN}$ signals.

In an alternative embodiment, the values for the known points may be stored in content addressable memories (CAMs). In that case, the table memories 30 and 32 store both the domain coordinate values and function values for the known points. The function values for the known points can then be accessed using the domain coordinate value of the desired point. The benefits of using CAM's include the facts that (1) the domain coordinate values for the known points need not lie on integer values, and (2) the differences between domain coordinate values need not be uniform. If the differences between the domain coordinate values are uniform, but not "one," the value as produced by adder 28 (FIG. 3) of the interpolation device 36, may be divided by the difference to produce the actual interpolation value. On the other hand, if the difference is not uniform, the table memories may couple the domain coordinate values to the interpolation device 36, which may determine the difference to be used in the division.

Systems, in accordance with the invention, for performing linear interpolation in multi-dimensional coordinate domains will be described in accordance with FIGS. 4A through 5.

Figure 4A:
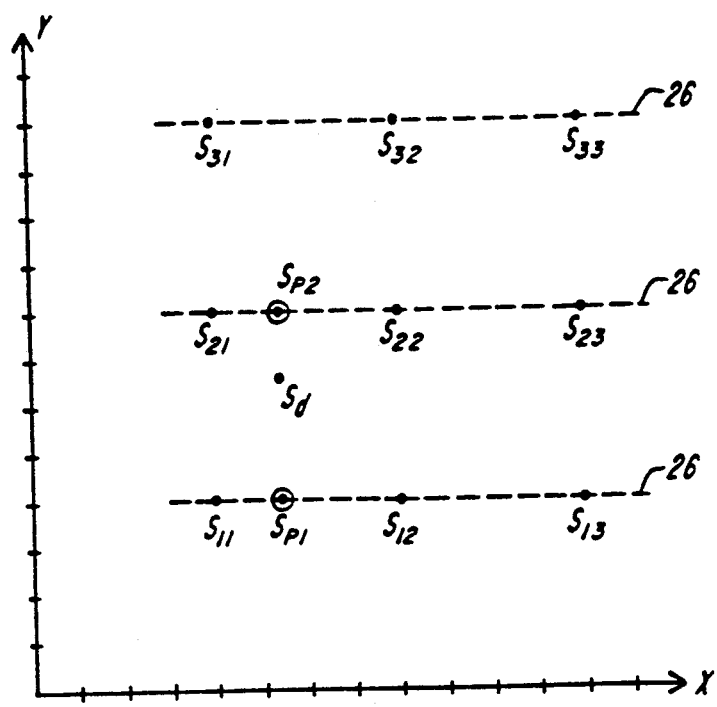
FIGS. 4A and 4B depict a two-dimensional domain useful in understanding multi-dimensional interpolation in accordance with the invention.

As shown in FIG. 4A, in a two-dimensional interpolation system, the locations of the points in the domain at which the function values are known form a two dimensional grid in a two dimensional domain denoted by axes x and y. The value of the function at the target point is determined by interpolation from function values at the four nearest known points, which form corners of a rectangular grid "window" in which the target point lies.

As seen in FIG. 4A, the target point $s_d$ is projected onto two of the lines 26 defined by the grid of points at which the function values are known. The resulting projection points are identified as points $s_{P1}$ and $s_{P2}$. A value for the function at these projections $s_{P1}$ and $s_{P2}$ can be calculated by a one dimensional interpolation system, such as described above in connection with FIGS. 1 through 3, using the pairs of known points $s_{11}$ and $s_{12}$, $s_{21}$ and $s_{22}$, respectively.

Figure 4B:
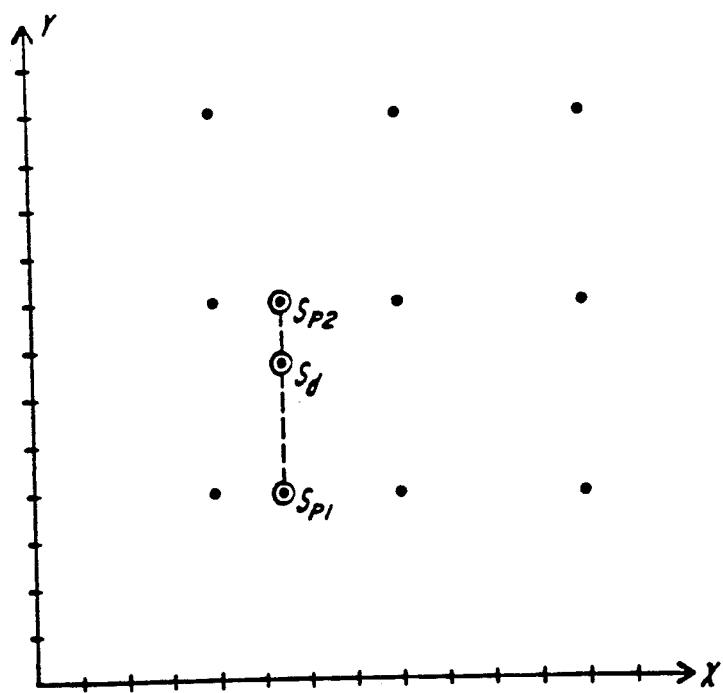

As shown in FIG. 4B, the two projection points $s_{P1}$ and $s_{P2}$ can be treated as known points in a one-dimensional domain coordinate system defined by the line between points $s_{P1}$ and $s_{P2}$, on which point $s_d$ lies. The two projections are collinear with the desired point, and thus the value of the function at the desired point $s_d$ can be calculated by one dimensional interpolation methods, using the calculated values for the function at the projection points $s_{P1}$ and $s_{P2}$.

Figure 5:
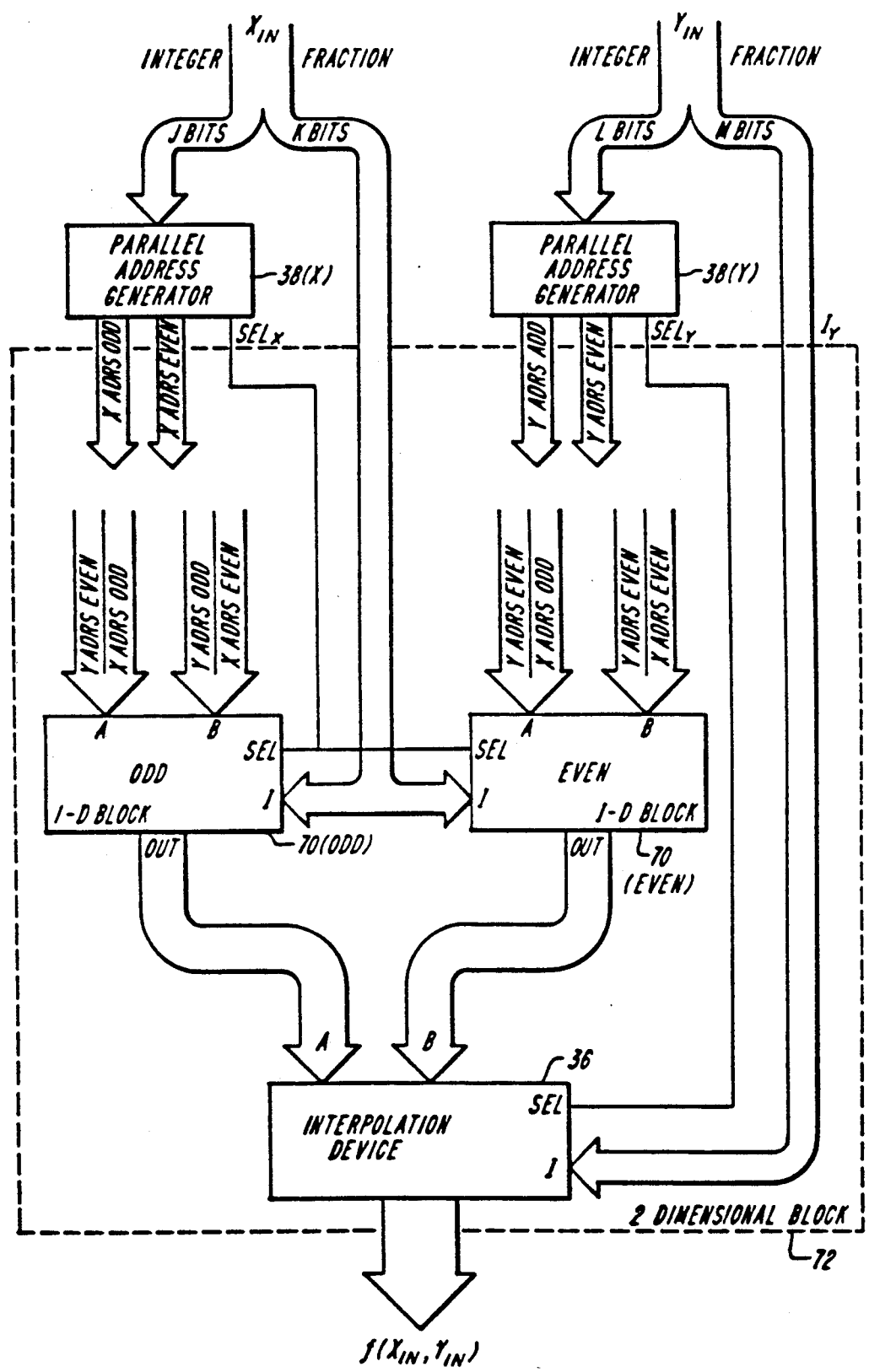
FIG. 5 depicts a functional block diagram of a linear interpolation system for performing linear interpolation in a two-dimensional domain.

FIG. 5 shows a circuit for performing interpolation in a two-dimensional coordinate domain according to the invention, in connection with $x_{IN}$ and $y_{IN}$ signals which identify the domain coordinate values, along the x and y axes respectively, for the target point. The circuit includes two one-dimensional interpolation blocks 70(ODD) and 70(EVEN), both corresponding to interpolation block 70 (FIG. 1). Each block 70(ODD) and 70(EVEN) stores in its table memories (not shown) the function values for the known points in the coordinate domain along alternating lines 26 as depicted in FIG. 4A. Using the circuit shown in FIG. 5, fractional signal $x_{IN}$ and the integer portion of $y_{IN}$ signal are coupled to the one-dimensional interpolation blocks 70, each of which provides the function values for one of the projection points $s_{P1}$ and $s_{P2}$. The outputs of the two one dimensional blocks 70 are coupled to an interpolation device 36, along with the fractional portion of the $y_{IN}$ signal, which provides the function value for the target point.

To accomplish this, the two one-dimensional interpolation blocks 70 include table memories (not shown in FIG. 5) that provide function values for points on alternating lines in the two-dimensional domain. That is, assuming the function values are provided along parallel lines, which are parallel to the x-axis, as shown in FIG. 4A, and which intersect the y-axis at integral points along the y-axis, the one-dimensional interpolation block 70(ODD) includes table memories, corresponding to table memories 30 and 32 FIG. 1), which provide function values along lines which intersect the y-axis at odd points along the y-axis, and the other interpolation block 70(EVEN) includes table memories, also corresponding to table memories 30 and 32, which provide function values along lines which intersect the y-axis at even points along the y-axis.

The table memories 30 and 32 in the interpolation block 70(ODD) stores function values at known points along a line stored therein in a set of successive memory locations, with function values along the successive lines being stored in successive sets of memory locations in the respective memories. The table memories 30 and 32 in the interpolation block 70(ODD) are both addressed in response to portions of the integer portion of the $x_{IN}$ input signals and the integer portion of the $y_{IN}$ input signals. Specifically, the address signals are generated by an address generator 38(x), which generates address signals in response to the $x_{IN}$ signals and an address generator 38(y), which generates address signals in response to the $y_{IN}$ signals, with both address generators 38(x) and 38(y) being the same as address generator 38 (FIG. 1). Each of the address generators 38(x) and 38(y) generate even and odd sets of address signals; in particular, the address generator 38(x) generates address signals X ADRS ODD odd address signals and X ADRS EVEN even address signals, both along the x-axis, and address generator 38(y) generates address signals Y ADRS ODD odd address signals and Y ADRS EVEN even address signals, both along the y-axis.

The table memories 30 and 32 in the interpolation blocks 70(ODD) and 70(EVEN) are addressed by address signals formed by various concatenations of the X ADRS ODD, X ADRS EVEN, Y ADRS ODD, and Y ADRS EVEN signals produced by the address generators 38(x) and 38(y). In particular, the table memory 30 (reference FIG. 1) in the interpolation block 70(ODD), which stores function values, at successive points, which have odd x-axis coordinate values, along successive lines which have odd y-axis coordinate values, is addressed by address signals formed by concatenating the X ADRS ODD odd x-axis address signals onto the low-order end of the Y ADRS ODD odd y-axis address signals. The Y ADRS ODD odd y-axis address signals identify a particular line in the domain, and thus a particular set of function values stored in the table memory 30 (reference FIG. 1), while the X ADRS ODD odd x-axis address signals identify a particular point on the line, and thus a particular memory location, in the set identified by the Y ADRS ODD odd y-axis address signals, which stores the function value for the point.

Similarly, the table memory 32 (reference FIG. 1) in the interpolation block 70(ODD), which stores function values, at successive points, which have even x-axis coordinate values, along successive lines which have odd y-axis coordinate values, is addressed by address signals formed by concatenating the X ADRS EVEN even x-axis address signals onto the low-order end of the Y ADRS ODD odd y-axis address signals. The Y ADRS ODD odd y-axis address signals identify a particular line in the domain, and thus a particular set of function values stored in the table memory 32, while the X ADRS EVEN even x-axis address signals identify a particular point on the line, and thus a particular location, in the set identified by the Y ADRS ODD odd y-axis address signals, which stores the function value for the point.

The table memory 30 (reference FIG. 1) in the interpolation block 70(EVEN), which stores function values, at successive points, which have odd x-axis coordinate values, along successive lines which have even y-axis coordinate values, is addressed by address signals formed by concatenating the X ADRS ODD odd x-axis address signals onto the low-order end of the Y ADRS EVEN y-axis address signals. The Y ADRS EVEN even y-axis address signals identify a particular line in the domain, and thus a particular set of function values stored in the table memory 30 (reference FIG. 1), while the X ADRS ODD odd x-axis address signals identify a particular point on the line, and thus a particular location, in the set identified by the Y ADRS EVEN even y-axis address signals, which stores the function value for the point.

Finally, the table memory 32 (reference FIG. 1) in the interpolation block 70(EVEN), which stores function values, at successive points, which have even x-axis coordinate values, along successive lines which have even y-axis coordinate values, is addressed by address signals formed by concatenating the X ADRS EVEN even x-axis address signals onto the low-order end of the Y ADRS EVEN even y-axis address signals. The Y ADRS EVEN even y-axis address signals identify a particular line in the domain, and thus a particular set of function values stored in the table memory 32 (reference FIG. 1), while the X ADRS EVEN even x-axis address signals identify a particular point on the line, and thus a particular location, in the set identified by the Y ADRS EVEN even y-axis address signals, which stores the function value for the point.

Thus, the four sets of address signals, generated by the concatenation of the X ADRS ODD odd x-axis address signals, X ADRS EVEN even x-axis address signals, Y ADRS ODD odd y-axis address signals, and Y ADRS EVEN even y-axis address signals, as described above, identify the four points in the domain proximate the target point at which the function points are known. As in the embodiment, depicted in FIG. 1, for performing interpolation in a one-dimensional domain, the address generators 38(x) and 38(y) generate, respectively, $SEL_x$ and $SEL_y$ select signals that indicate whether the odd- and even-valued domain coordinates are greater and less than the domain coordinate values of the target point, as represented by the $x_{IN}$ and $y_{IN}$ signals, respectively.

As noted above, the interpolation blocks 70(ODD) and 70(EVEN) generate the interpolated values for the projection points $s_{P1}$ and $s_{P2}$. An interpolation device 36, which is identical to that depicted in FIG. 3, receives the interpolated values from the interpolation blocks 70(ODD) and 70(EVEN) and uses them, along with the $SEL_y$ select signal and the fraction portion of the $y_{IN}$ signals, to generate an interpolated value for the target point. It will be appreciated that the $SEL_y$ select signal indicates which of the projection points $s_{P1}$ and $s_{P2}$ is associated with the interpolated value produced by the interpolation block 70(ODD) and 70(EVEN).

The invention can be extended to provide interpolated values for higher-dimensioned domains in a similar manner. For example, to perform an interpolation in a three-dimensional domain, defined by orthogonal x-, y- and z-axes, it may be recognized that the target point, defined by a coordinate $x_{IN}$, $y_{IN}$, and $z_{IN}$, may first be projected, along a line parallel to the z-axis, onto two parallel planes at, for example, integral locations along the z-axis. Each of the planes may define sets of lines, parallel to the x-axis, which intersects the y-axis at integer locations along the y-axis, with each line containing points, at integer locations along the x-axis, at which the function values are known. An interpolation circuit includes two two-dimensional interpolation blocks, similar to that shown in FIG. 5, with the addition that the each of the table memories includes additional sets of memory locations for each of the planes, and the memories are thus also addressed by Z ADRS ODD odd z-axis address signals and Z ADRS EVEN even z-axis address signals provided by an address generator, substantially similar to the address generator 38 (FIG. 2), in response to an integer portion of the $z_{IN}$ signal. An interpolation device, similar to that depicted in FIG. 3, receives interpolated values from each of the two-dimensional interpolation blocks, which represent interpolated values in each of the planes parallel to the z-axis, and uses them, the fractional portion of the $z_{IN}$ signal and $SEL_z$ select signal to generate the interpolated value. Interpolation in higher-dimensioned domains can be accomplished by a similar extension from successive lower-dimensioned domains.

This invention has been illustrated through the use of a particular embodiment. Other embodiments are within the scope of the appended claims. For example, the interpolation method may use a cylindrical, radial, or any other coordinate system. Also, the known points need not be arranged in a grid, rather, they may be randomly dispersed. In a one dimensional system, the points need not be evenly spaced. In an n-dimensional system, the sets of collinear points need not form parallel lines or planes.

We claim:

1. An interpolation system for generating an interpolated value in response to an input value, the input value being represented by a plurality of input signals having a high order portion and a low-order portion, the interpolation system comprising:
   A. a function value store comprising a plurality of function value storage tables for storing function values for alternating domain coordinate values in a domain;
   B. an address generator responsive to the input value for generating even and odd address signals identifying locations in the function value storage tables to enable the function value storage tables to transmit even and odd function values in parallel; wherein said addresser generator further generates a select signal, in response to the high-order portion of the input signals, which identifies which of the even and odd function values represent a function value for a domain coordinate value greater than the input value, and
   C. an interpolator for receiving said select signal, the function values transmitted in parallel by the function value storage tables, and the input value and generating in response thereto the interpolated value.

2. An interpolation system as defined in claim 1 in which said interpolator comprises:
   A. a subtracter portion for generating a difference value in response to the function values transmitted by the function value store;
   B. a multiplier portion for generating a product value in response to the difference value generated by the subtracter portion and the input value; and
   C. an adder portion for generating the sum of the product value generated by the multiplier portion and a function value transmitted by the function value store.

3. An interpolator system as defined in claim 1 in which said address generator comprises coupling means for coupling a most-significant bit set of a high-order portion of the input signals as the odd address signals, and the sum of the most significant bit set of a high-order portion of the address signals and a least significant bit of the high-order portion of the address signals as the even address signals.

4. An interpolation system as defined in claim 1 for generating an interpolated value in a one-dimensional domain, the function value store comprising two function value storage tables each including a plurality of addressable storage locations for storing function values for alternate domain coordinate values in the domain at storage locations whose addresses are related to the respective domain coordinate values.

5. An interpolation system as defined in claim 4 in which the function value storage tables comprise an even function value storage table and an odd function value storage table, the address generator generating the even address signals for addressing the even function value storage table and the odd address signals for addressing the odd function value storage table.

6. An interpolation system as defined in claim 5 in which the interpolator includes:
   A. a selector for receiving the function values from the even function value store and the odd function value store and for coupling them in order of respective domain coordinate values in response to the select signal,
   B. a subtracter portion for generating a difference value in response to the ordered function values from the selector;
   C. a multiplier portion for generating a product value in response to the difference value generated by the subtracter portion and the low order portion of the input signals; and
   D. an adder portion for generating the sum of the product value generated by the multiplier portion and a function value transmitted by one of the even function value store and the odd function value store.

7. An interpolation system as defined in claim 5 in which the function value storage tables store function values for integral domain coordinate values, the address generator generating even address signals and odd address signals identifying addresses which differ by at most one.

8. An interpolation system as defined in claim 4 in which the interpolator includes:
   A. a subtracter portion for generating a difference value in response to the function values transmitted by the even function value store and the odd function value store;
   B. a multiplier portion for generating a product value in response to the difference value generated by the subtracter portion and the low order portion of the input signals; and C. an adder portion for generating the sum of the product value generated by the multiplier portion and a function value transmitted by one of the even function value store and the odd function value store.

9. An interpolation system for generating an interpolated value in a multidimensional domain in response to a multidimensional input value representing a target point in said multidimensional domain, the interpolation system comprising:

a plurality of table memories for collectively storing values of a function for known points in said multidimensional domain;

an address generator for generating addresses for selecting, from each of said plurality of table memories, a stored value of the function for a neighboring known point which is closer to said target point in said multidimensional domain than all other known points whose values are stored in said table, thereby enabling each of a plurality of said table memories to simultaneously transmit said selected function values in parallel; and an interpolator for receiving said selected values from said plurality of table memories in response to said addresses and generating in response thereto the interpolated value, said interpolator comprising a plurality of successive interpolation stages each stage performing interpolation in an associated dimension of said multidimensional domain.

10. The interpolation system of claim 9 in which the input value comprises, for each dimension of the domain, an input coordinate value having a high order portion and a low order portion, and wherein said address generator comprises:

for each dimension of said domain, a single dimensional address generator for receiving the high order portion of said input coordinate value and providing in response thereto a single dimensional odd address and a single dimensional even address, and means for providing each said table memory with a unique multidimensional address comprising, for each dimension of said domain, one of said single dimensional odd address and said single dimensional even address.

11. The interpolation system of claim 10 wherein each said table memory comprises a plurality of storage locations addressable by said unique multidimensional address, and wherein:

each said location stores a value of said function for one said known point;

each single dimensional address of said unique multidimensional address identifies a plurality of locations in said table containing sample function values of known points adjacent to said target point in said associated dimension of said multidimensional domain; and wherein said single dimensional addresses which comprise said multidimensional address collectively identify a single location in said table containing said neighboring known point.

12. An interpolation system as defined in claim 10 in which said single dimensional odd and even addresses provided by each single dimensional address generator identify a plurality of locations in each said table containing sample function values of known points adjacent to said target point in said associated dimension of said multidimensional domain; and wherein each said single dimensional address generator further generates a select signal, in response to said high-order portion, identifying which of said single dimensional odd address and said single dimensional even address identifies locations containing known points whose domain coordinate value is greater than the domain coordinate value of said target point.

13. An interpolation system as defined in claim 10 in which each said single dimensional address generator couples a most-significant bit set of said high-order portion as the odd address and the sum of a most significant bit set of said high-order portion and a least significant bit of said high-order portion as said even address.

14. The interpolation system of claim 9 in which the input value comprises, for each dimension of the domain, an input coordinate value having a high order portion and a low order portion, and wherein said plurality of successive interpolation stages includes a first stage for interpolating between at least one pair of said selected values in a first dimension of said multidimensional domain, said first stage comprising:

for each pair of selected values, identification means for identifying from said pair of function values, an upper function value which represents the value of the function at a domain coordinate value greater than the input coordinate value for the first dimension and a lower function value which represents the value of the function at a domain coordinate value lower than the input coordinate value for the first dimension, a subtractor means for subtracting said lower function value from said upper function value to produce a difference value;

a multiplier portion for generating a product value representing the product of said difference value and the low order portion of the input coordinate value for the first dimension; and an adder portion for generating the sum of the product value generated by the multiplier portion and said lower function value to form a projection value of the function at a projection point between the points in said multidimensional domain corresponding to said pair of selected values.

15. The interpolation system of claim 14 wherein said plurality of successive stages comprises a second stage for interpolating between at least one pair of said projection values in a second dimension of said multidimensional domain.

16. The interpolation system of claim 14 wherein, for each dimension, said address generator comprises means for generating a select signal in response to said high order portion of said input coordinate value for said dimension, said select signal identifying said upper and lower function values.

17. The interpolation system of claim 16 wherein said select signal for a given dimension comprises a least significant bit of said high order portion for said given dimension.

18. The interpolation system of claim 17 wherein said subtractor means comprises a first input for receiving said upper function value and a second input for receiving said lower function value and wherein said identification means comprises a multiplexer means for receiving said pair of selected values and in response to said select signal for an associated dimension providing said upper function value to said first input and said lower function value to said second input.

* * * * *